United States Patent [19]

Flachbarth et al.

[11] 3,889,044
[45] June 10, 1975

[54] SERVICE POLES
[75] Inventors: Charles T. Flachbarth; John L. Myers, both of Parkersburg, W. Va.
[73] Assignee: Textron Inc., Providence, R.I.
[22] Filed: Apr. 29, 1974
[21] Appl. No.: 464,803

[52] U.S. Cl. .............................. 174/48; 220/3.94
[51] Int. Cl. .......................................... H02g 3/04
[58] Field of Search .......... 174/48, 49; 52/220, 221; 220/3.92, 3.94

[56] References Cited
UNITED STATES PATENTS
| | | | |
|---|---|---|---|
| 1,982,502 | 11/1934 | Douglas | 220/3.94 |
| 2,265,926 | 12/1941 | Pike | 220/3.94 |
| 3,082,290 | 3/1963 | Ohmit | 174/49 |
| 3,534,319 | 10/1970 | Queirolo et al. | 174/48 X |
| 3,609,211 | 8/1970 | Van Herk | 174/49 |

Primary Examiner—J. V. Truhe
Assistant Examiner—David A. Tone
Attorney, Agent, or Firm—Frederick J. Olsson

[57] ABSTRACT

A power-telephone service pole having a cover which is removable simply by being pried off when the pole is installed so that the telephone compartment is readily available and having a T-bar/tie-rod hanger and a power junction box which cooperate with the removable cover to permit the pole to be quickly installed or relocated together with a pedestal adapting the pole alternately for use on tile or on carpet and for being spotted in position by means of floor studs or screws.

16 Claims, 10 Drawing Figures

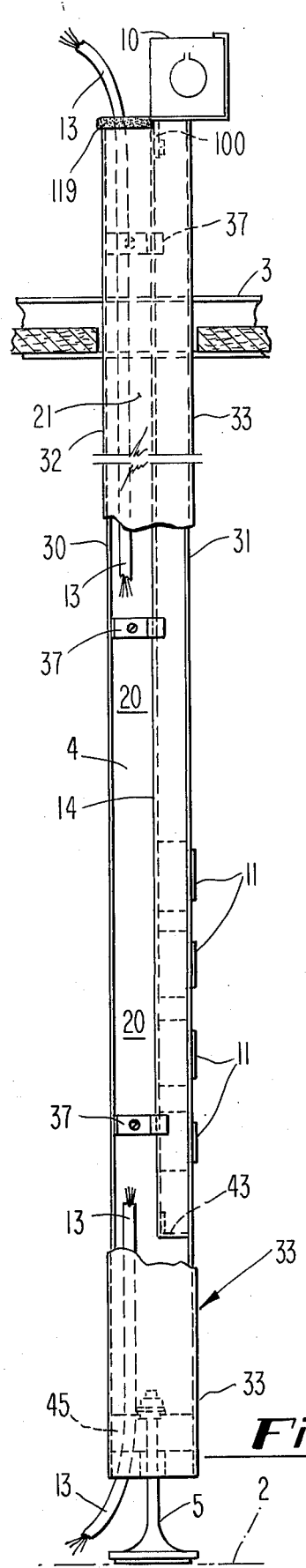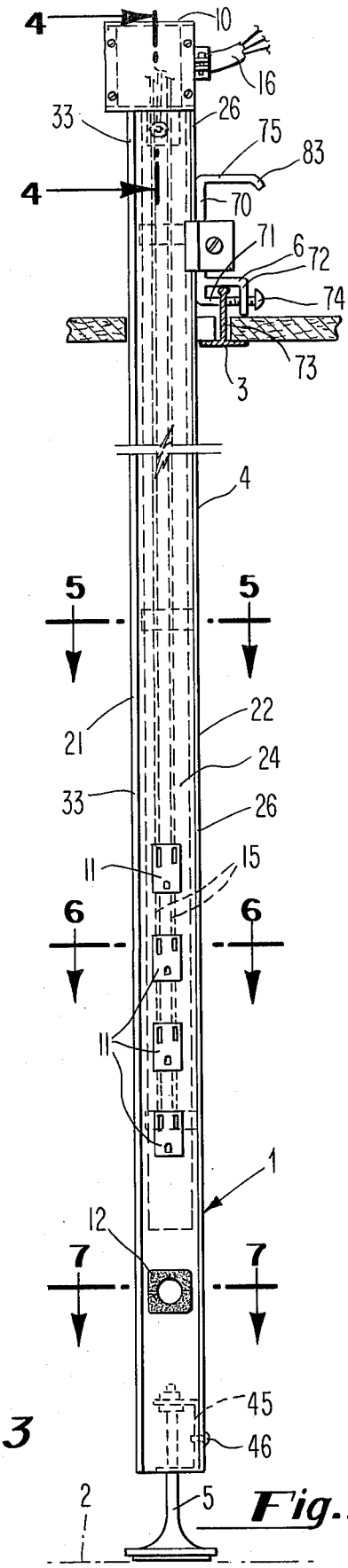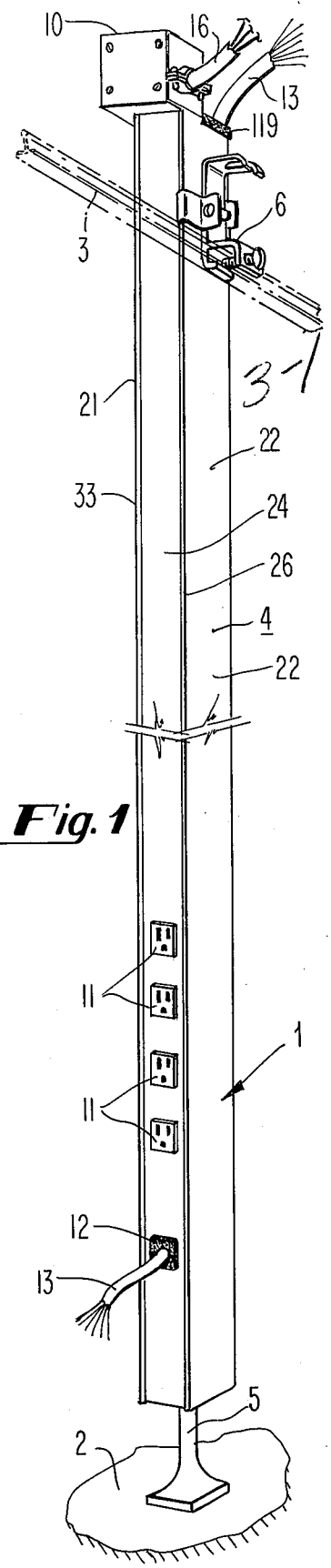

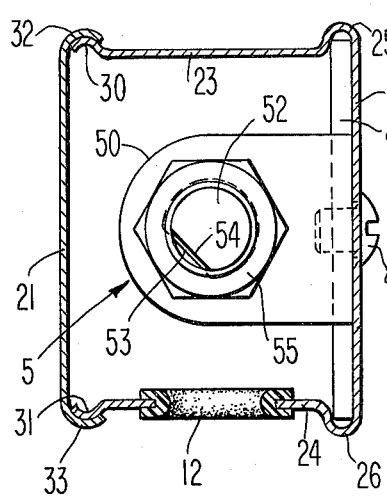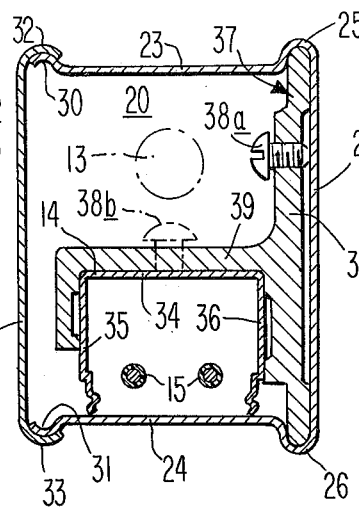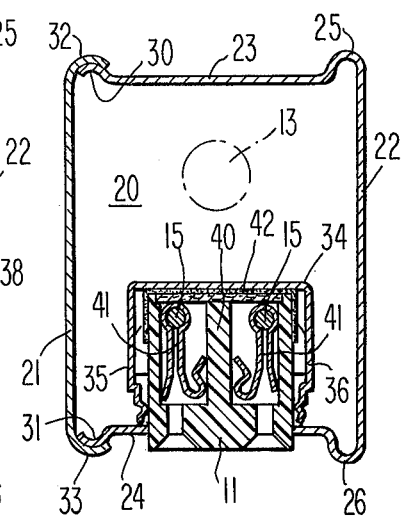
Fig. 7       Fig. 5       Fig. 6
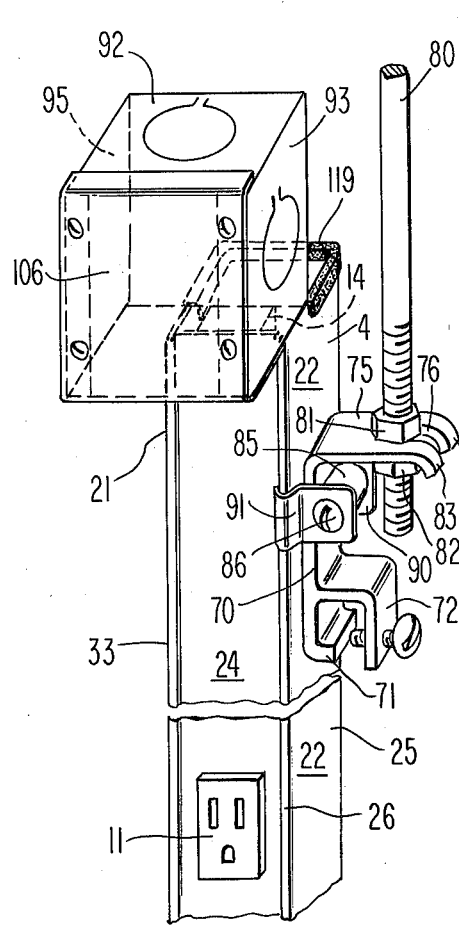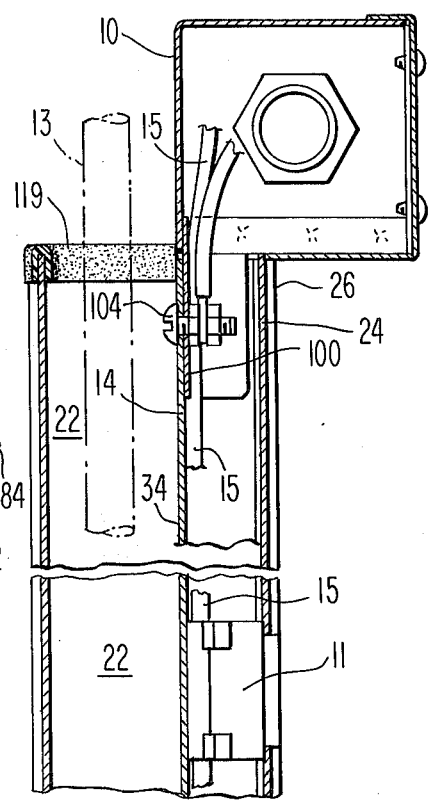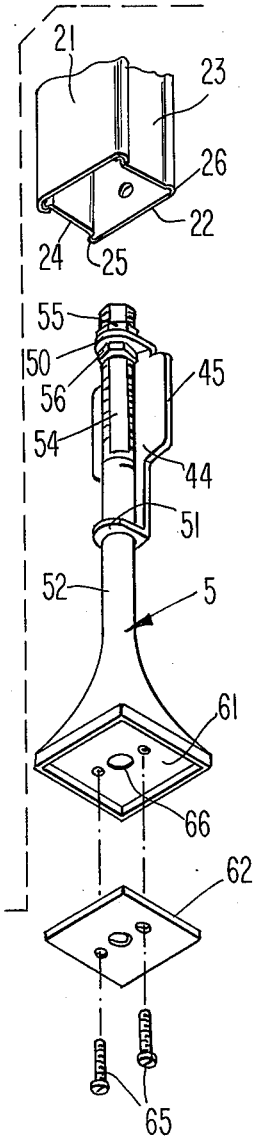
Fig. 8       Fig. 4       Fig. 9

SERVICE POLES

This invention relates to electrical and communication distribution systems in buildings or the like and in particular relates to a pole to provide power and/or telephone service.

One of the objects of the invention is to provide a service pole made of components of simplified construction which are fabricated as by roll forming and/or by extrusion and thereby reduce manufacturing costs.

Another object of the invention is to provide a service pole having major components formed by extrusion and roll forming which easily slide together and are held by a minimum of fasteners to thereby reduce pole fabrication and assembly costs.

Another object of the invention is to provide a service pole including C-shaped, roll formed, inner and outer housings held together by an extruded retainer, for assembly, the retainer being adapted to slide into the outer housing and the inner housing being adapted to slide into the retainer, the sliding arrangement minimizing assembly costs.

Another object of the invention is to provide a service pole having a hanger made from an extrusion which provides means alternatively usable to connect the hanger to a T-bar to a tie rod.

Another object of the invention is to provide a service pole having a cover which can be easily removed (or replaced) while the pole is installed so as to provide access to the telephone compartment for service or disconnecting.

Another object of the invention is to provide a service pole with a removable cover, a hanger and a power junction box which cooperate to permit quick connect and disconnect so that the pole can be rapidly installed and relocated.

Another object of the invention is to provide a service pole having a supporting pedestal which provides for quick vertical adjustment and which is adaptable for use on both carpet and tile and for use in locating the pole by floor-installed studs or screws.

Other objects and various advantages of the invention will be apparent from the following description taken in conjunction with the drawings wherein.

FIG. 1 is a perspective view of a pole constructed in accordance with the invention;

FIG. 2 is a side elevational view of the pole of FIG. 1;

FIG. 3 is a side elevational view of the pole of FIG. 1 with the cover partially removed;

FIG. 4 is an elevational view taken along the lines 4—4 of FIG. 2;

FIG. 5 is a plan view taken along the lines 5—5 of FIG. 2;

FIG. 6 is a plan view taken along the lines 6—6 of FIG. 2;

FIG. 7 is a plan view taken along the lines 7—7 of FIG. 2;

FIG. 8 is a fragmentary, perspective view of the top of the pole showing the power junction box and the T-bar/tie-rod hanger.

FIG. 9 is an exploded view of the pedestal which supports the pole;

Figure 10:
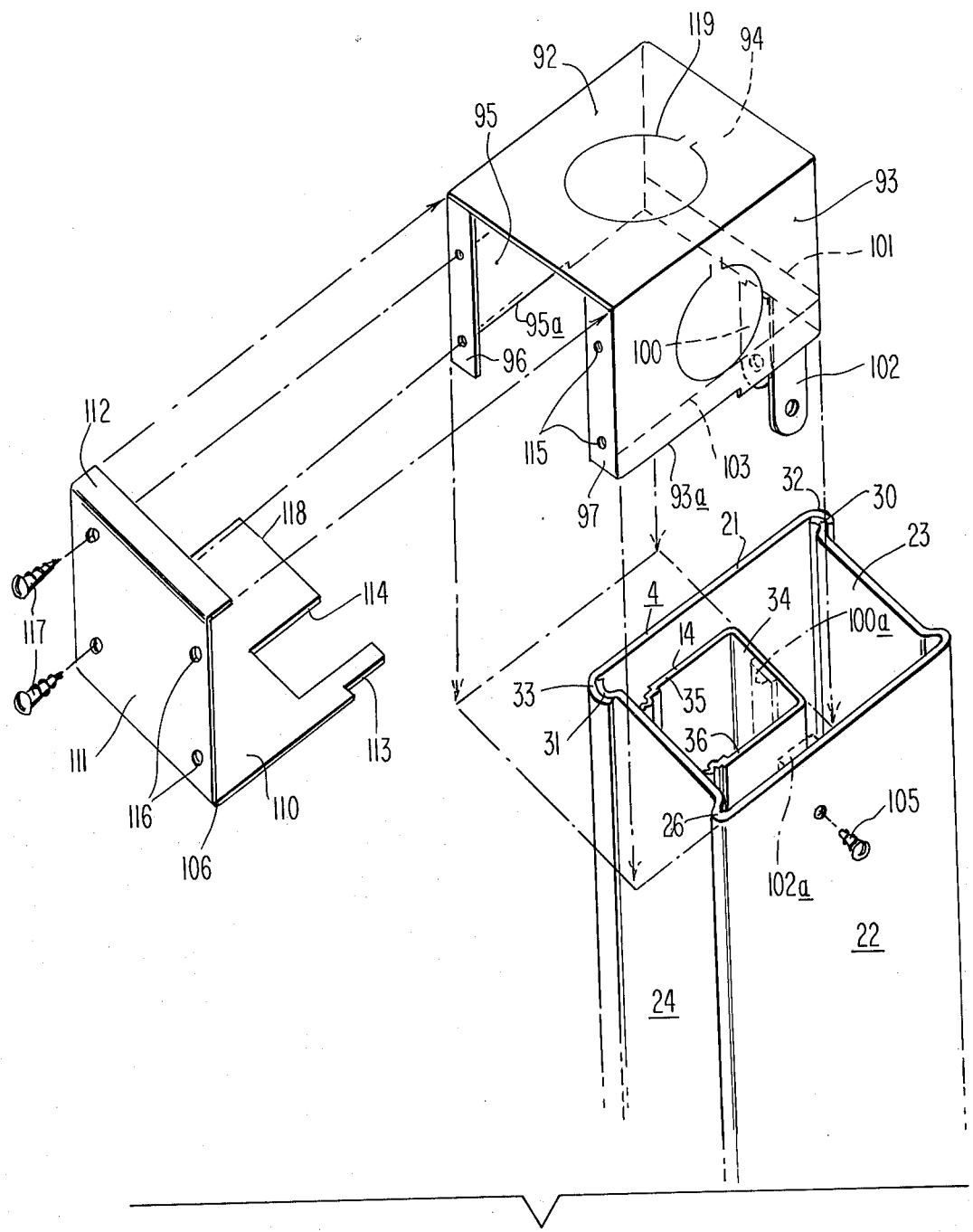
FIG. 10 is an exploded view of the top of the pole and the power junction box.

In FIG. 1 the pole 1 extends between the floor 2 and a suspended ceiling T-bar which is indicated at 3.

The pole includes the outer housing 4, the support pedestal 5, the hanger 6, the power junction box 10, the power receptacles 11 and the telephone outlet or grommet 12 carrying the telephone cable 13.

With reference to FIG. 3, the pole has an inner housing 14 which extends from the top of the outer housing 4 down partially along the full length. The inner housing 14 mounts the junction box 10 and power receptacles 11. The power conductors 15 (FIG. 2) feed the receptacles from the junction box. The conductors are joined in the junction box to the service line 16.

The inner housing 14 is smaller in cross sectional area than the outer housing 14. This provides internal space forming a telephone cable compartment 20. The telephone cable 13 (FIG. 1) extends from the top of the pole down through the compartment 20 and then outwardly either through the grommet 12 (FIG. 1) or down and out at the bottom as indicated in FIG. 3. The inner housing 14 isolates the power conductors and receptacles from the telephone compartment.

The outer housing 4 has a cover 21 (FIG. 3) which extends the full length of the housing and can be removed to make the compartment 20 accessible. An important feature is that none of the above mentioned components offer interference to the cover being pried off and then replaced while the pole is installed.

The details of construction on the various components mentioned above will next be described.

The cross sectional shape of the outer housing 20 is best seen in FIGS. 5, 6 and 7. The housing is C-shaped having a flat base 22 and a pair of side walls 23 and 24. The joinder areas between the base and the side wall are formed with outwardly extending pockets 25 and 26. These pockets are coextensive with the length of the housing. The outer edges of the sides 23 and 24 are offset as indicated at 30 and 31. These offsets extend the full length of the housing. As noted, the cover 21 extends over the open side of the housing. The edges 32 and 33 of the cover are contoured to fit the offsets 30 and 31. The dimensions are such that the cover can be snapped into place and then pried off.

The cover is best pried off by pulling one edge away from the housing edge at the bottom and running the blade of a screw driver up between the cover edge and housing edge.

The above described shape of the outer housing 4 and cover 21 are such that the same are readily adaptable to fabrication either by roll forming or by extrusion.

The inner housing 14 is likewise C-shaped having a base 34 and two sides 35 and 36. The open side of the housing is closed off by the side 24 of the outer housing. As noted in FIG. 5, the cross sectional area of the inner housing 14 is smaller than the cross sectional area of the outer housing 4 and this difference in area provides the space forming the telephone compartment 20.

The inner housing 14 is supported by a plurality of retainers 37 the general shape of which is best shown in FIG. 5. The retainer includes a base 38 and a socket 39 which envelopes the inner housing 14. As noted, the base 38 extends out into the pockets 25 and 26. The screw 38a when tightened down wedges the base against the pockets. The retainers are fabricated by extruding a blank of the cross sectional shape shown and then cutting sections from the blank.

As noted in FIG. 3, there are three retainers 37 spaced along the outer housing 4 to retain the inner housing 14 in the position as shown in FIG. 5. The inner housing 14 is retained in a vertical direction by being fastened to the junction box 10 which in turn rests on and is fixed to the outer housing 4 as will be explained later. Where a junction box of the structure of box 10 is not used, the inner housing can be retained by set screws in the retainers such as the set screw indicated by the dotted lines 38b in FIG. 5 which preferably has a tapered end to bite into the base 34.

The base of each retainer makes a snug, sliding fit with the pockets, 25 and 26. For assembly, the retainers are slid into the outer housing 4 and then locked into position by the set screw 38a. The inner housing 14 makes a snug, sliding fit with the socket 39 so that for assembly the inner housing 14 is slid into the sockets 39. The sliding arrangement is highly advantageous in that it reduces assembly and fabrication time.

The receptacles 11 are supported by the inner housing. Each receptacle includes the insultated block 40 retained in the housing by wedging means not shown. The block has a cavity which supports the contacts 41 connected to the power conductors 15. The cap assembly 42 confines the contacts within the cavities. It is contemplated that the inner housing 14 be wired prior to assembly to the outer housing with the power conductors 15 and the receptacles 11. The above described receptacle structure is conventional.

As noted in FIGS. 2 and 3 the top of the housing 14 and the top of the housing 4 are flush and the inner housing extends downwardly from the top and terminates a short distance from the end of the outer housing. The lower end of the inner housing has a closure cap as indicated at 43.

From the foregoing description it will be observed that inner housing effectively isolates the power conductors and the receptacles from the telephone compartment 20.

The structure of the pedestal 5 will be described in connection with FIG. 9.

The bracket 44 is substantially flat and makes a firm contact with the base 22 of the outer housing. The base has an enlarged section extending laterally into the pockets 25 and 26 which make a snug but sliding fit (see FIG. 7). This maintains the bracket against lateral movement. A screw 46 (FIGS. 2 and 7) holds the base in position against vertical movement.

The bracket includes the apertured flanges 50 and 51 which extend outwardly from the base and receive the threaded portion of a foot 52 which makes a sliding fit therewith. The top flange 50 has a flat 53 (see FIG. 7) which mates with a flat 54 on the leg 52. This prevents rotation of the foot. The nuts 55 and 56 lock the leg with respect to the bracket 44 and the housing 4. The vertical position of the pole can be adjusted by the location of the lower nut 56 on the leg.

The bottom of the foot has an underside cavity 61 which is adapted to hold either the tile plate 62 or the carpet plate 63.

The plate 62 is made of rubber or other resilient material so as to maintain a grip on tile. Plate 63 has prongs 64 which are adapted to grip the carpet pile to maintain position. The plate 63 may be made of metal with the prongs 64 lanced as shown or the plate may be made of polycarbonate plastic with the prongs molded in. The plates are held in the cavity by the screws 65.

In certain installations it is required to lock the bottom of the pole with a positive mechanical stop. For such applications the foot has been provided with an aperture 66 which is adapted to receive a screw or a stud driven into the floor. The plates 62 and 63 are apertured so as to accomodate the stud or screw.

It will be noted that the pole housing 4 and the base 50 are rectangular. The flats 53 and 54 align the two rectangular configurations and maintain the relationship.

For assembly, the bracket 44 and foot 52 are assembled as indicated. The bracket is slid up into the pockets 25 and 26 and the screw 46 secured in place. When the pole is finally positioned vertical adjustments are made via the nuts 55 and 56.

The structure of the bracket has several important advantages; i.e. provides space for a telephone cable to exit through the bottom of the pole; is accessible for quick vertical adjustment when the cover is removed; has simplified structure which is not only easy to fabricate by conventional tools but can be quickly assembled; attains lateral and vertical stability by its engagement with the outer housing and the use of a single screw; and has quick adaptability for either tile or carpet and for use with locator studs.

The hanger 6 which provides for the top of the pole to be anchored to a T-bar or to a ceiling tie-rod will next be described with particular reference to FIG. 8.

The base 70 is substantially flat and engages the base 22 of the outer housing. A pair of jaws 71 and 72 extend outwardly from the bottom of the base. The jaws face one another and are spaced apart to receive the leg 73 of the T-bar 3 (FIG. 2). Screw 74 operating in the jaw 72 clamps the leg 73 against the jaw 71.

A connector flange 75 is slotted at 76 for receiving the threaded tie rod 80. The nuts 81 and 82 lock the tie rod and hanger together. The ends 83 and 84 of the flange are turned down to maintain the nut 82 in position.

The hanger includes a removable clamp. The center of the bar 70 has a raised section 85 provided with a clearance hole to receive nut-bolt assembly 86. The bolt holds a pair of S-shaped clamps 90 and 91 which respectively grip the pockets 25 and 26. The nut (not shown) is threaded on the bolt and operates against the clamp 90. When the nut and bolt are tightened, the clamp squeezes the pockets 25 and 26 and the base 70 and thereby hold the hanger in position on the outer housing.

The hanger is made by extruding a blank having the cross sectional shape indicated and then cut into sections of the proper width. The slot 76 is then formed in the flange 75.

The structure of the hanger has several distinct advantages; i.e. it is quickly removed from the T-bar on the tie-rod and from the pole and easily adjusted either up or down. This enhances the speed of installation and also minimizes the time for relocation of a pole. Moreover, it will be particularly noted that as mounted on the pole no part of the hanger offers interference to removal or replacement of the cover.

The power junction 10 at the top of the pole will next be described particularly with reference to FIG. 10.

The box includes a cubical-shaped body comprising the top 92, the three closed sides 93, 94, 95 and open side (opposite to the side 94) and an open bottom. The sides 95 and 93 carry mounting flanges 96 and 97.

The side 94 carries the tongue 100. The tongue is attached to the side by the fact that it is part of a cross piece 101 which is spot welded to the side 94. The side 93 has a downwardly extending tongue 102 which is secured to the side by the fact that it is a part of a cross piece 103 spot welded to the side 93. The tongues 100 and 102 are oriented at right angles to each other.

The box is adapted to rest on top of the housing with lower edges of the sides 93 and 95 in contact with the edge of the base 22 and the edge of the cover 21. The lower edge of the side 94 is in contact with edge of the base 34. In this position the tongue 100 extends down into the inner housing 14 in contact with the base 34 in the location indicated by the dotted lines 100a. The tongue 100 is secured to the base 34 by the nut and bolt assembly 104 (see FIG. 4). The assembly 104 also serves as a ground connection for the power conductors.

The tongue 102 extends down into the outer housing 4 in contact with the base 22 in the location as noted by the dotted lines 102a. The tongue 102 and the base 22 have clearance apertures which accept a self-tapping screw 105 which operates to lock the tongue 102 in position.

The box includes the L-shaped cover 106 having a bottom leg 110 and a vertical leg 111 capped by the flange 112. The bottom leg 110 has a cut-out section 113 which is for accommodating the tongue 102. The leg 110 has a larger cut-out section 114 which has a cross-sectional area the same as the inner housing 14.

When the body is mounted on the housing as above described, the cover 106 is moved to the right so that the leg 110 slides into the area provided by the undercut areas 93a and 95a so that the large cut-out 114 is aligned with the open end of the inner housing. This provides a passage for power conductor from the inner housing to the junction box. The vertical leg 111 contacts the flanges 96 and 97 and the flange 112 fits over the top 92. The threaded apertures 115 in the flanges 96 and 97 are aligned with the clearance holes 116 for screws 117 to secure the cover in place. The edge 118 of the leg 110 extends inwardly so that it abuts the side 94. With the junction box 10 in place, the telephone channel 20 remains open ended. Preferably, a grommet 119 is used at the end of the channel.

The sides of the junction box are provided with appropriate knock-outs 119. Similar to the inner housing 14, the junction box isolates the power conductors from the telephone cable.

The structure of the junction box provides a ready and convenient means for connecting and disconnecting the service lines and the power conductors both from the standpoint of initial installation and subsequent relocation of the pole. For power connection, the cover is removed, the service cable attached to the box and the service cable and the power conductors are brought out of the box and secured together by wire nuts. The connected wires are then pushed back into the box and the cover secured. If the pole is to be relocated, the cover is taken off, the conductors disconnected and the service cable is disconnected from the box.

The structure of the junction box in being attached to the inner housing enhances the assembly procedure for the pole. Thus, when the inner housing is pre-wired with receptacles and power conductors, the junction box is secured with the nut and bolt assembly 104 and the power conductors brought up and into the junction box. The sub-assembly is mounted by sliding the inner housing into the retainers as previously described. The screw 105 is then used to lock the junction box to the outer housing.

As previously mentioned, the junction box rests on the top edge of the inner and outer housings and this contact together and the engagement of the bolt 104 and screw 105 provides a means to prevent the inner housing from sliding downwardly.

We claim:

1. A service pole for supplying power and/or telephone outlets in a room, the pole being adapted to extend between the floor and the ceiling of the room and the ceiling being the suspended type having inverted T-bar members for supporting panels, the pole comprising:
   an elongated, hollow housing for carrying power and/or telephone conductors, the housing being formed with one side open;
   a cover removably connected to the housing and extending over said open side, the open side providing access to the interior of the housing with the cover removed; and
   a T-bar and tie-rod hanger comprising a base engaging said housing adjacent the top thereof, removable clamp means engaging the housing and said base and holding the hanger against the housing, a pair of spaced jaws extending outwardly from the bottom of the base for receiving the leg of a T-bar therebetween, a screw threaded in one jaw and operative to engage the T-bar leg and clamp the same against the other jaw and a connector flange extending outwardly from the top of the base and having a slot for receiving a tie rod, said base, said clamp, said jaws and said connector flange each being spaced from said cover so as not to interfere with removal of the cover.

2. A construction in accordance with claim 1 wherein said removable clamp means comprises:
   a bolt support formed in said base;
   a pair of grips each engaging said housing and disposed on opposite sides of said bolt support; and
   a nut and bolt assembly, the bolt extending through said support and through said grips, the head of the bolt engaging one grip and the nut engaging the other grip, the nut and bolt being operative to pull the grips tight against the housing and tight against the base to thereby secure the hanger to the housing.

3. A service pole for supplying power and/or telephone outlets in a room, the pole being adapted to extend between the floor and the ceiling of the room and the ceiling being the suspended type having inverted T-bar members for supporting panels, the pole comprising:
   an elongated, hollow housing for carrying power and/or telephone conductors, the housing being formed with one side open;
   a cover removably connected to the housing and extending over said open side, the open side providing access to the interior of the housing with the cover removed; and
   a T-bar hanger comprising a base engaging said hollow housing adjacent to the top thereof, removable clamp means engaging the housing and the base and holding the hanger against the housing, a pair of spaced jaws extending outwardly from the bottom of the base for receiving the leg of a T-bar therebetween, a screw threaded in one jaw and operative to engage the leg of the T-bar and clamp the same against the other jaw, said base, said clamp and said jaws each being spaced from said cover so as not to interfere with removal of the cover.

4. A service pole for supplying power and/or telephone outlets in a room, the pole being adapted to extend between the floor and ceiling of the room and the ceiling being the suspended type having means for supporting panels, the pole comprising:

an elongated, hollow housing for carrying power and/or telephone conductors, the housing being formed of one side open;

a cover removably connected to the housing and extending over said open side, the open side providing access to the interior of the housing with the cover removed;

means adjacent the top of the housing for connecting the housing to ceiling whereby to support the housing in an upright position;

a pedestal at the bottom of the housing for supporting said housing on the floor comprising a bracket inside the housing having a base engaging the housing, means securing the base to the housing and a pair of flanges respectively connected adjacent to the top and bottom of the base and extending outwardly therefrom, the flanges being formed with aligned apertures, the aperture in one of the flanges being formed with a flat;

a foot having a base and a threaded leg, the leg extending through said aligned apertures and making a sliding therewith, and the leg having a flat engaging said aperture flat to prevent rotation of the pedestal with respect to the housing and the leg being spaced from the housing and cover to provide an opening accommodating the passage of telephone cable; and a pair of nuts threaded on said leg respectively on the top side and bottom side of one of said flanges for securing the leg to the flange, the position of the bottom nut determining the relative vertical position of the housing and pedestal.

5. A construction in accordance with claim 4 further including:

plate means having a clearance aperture formed in the center thereof;

a cavity on the bottom of said base mounting said plate means; and a locating aperture formed on the bottom of said base and aligned with said plate clearance aperture, said apertures being adapted to receive a locating and holding stud anchored to the floor.

6. A construction in accordance with claim 5 wherein said plate means comprises:

a body made of resilient material, the resiliency adapting the service pole for use with a tile floor.

7. A construction in accordance with claim 5 wherein said plate means comprises:

a body made of resilient material and having a plurality of carpet grippers extending downwardly from the bottom of the plate, the grippers adapting the service pole for use with a floor carpet.

8. A service pole for supplying power and/or telephone outlets in a room, the pole being adapted to extend between the floor and ceiling of the room and the ceiling being the suspended type having means for supporting panels, the pole comprising:

an elongated, hollow C-shaped housing for carrying power and/or telephone conductors, the housing having a base and two sides and the joinder area between the base and the sides being formed with outwardly extending pockets;

a cover removably connected to the housing and extending over the open side of the housing, the open side providing access to the interior of the housing with the cover removed;

means adjacent the top of the housing for connecting the same with the ceiling whereby to support the housing in an upright position;

a pedestal at the bottom of said housing for supporting the housing on the floor comprising a bracket inside the housing having a base engaging the housing and extending into and engaging said pockets to provide lateral stability for the bracket, means securing the base to the housing and a pair of flanges respectively connected to the top and bottom of the base and extending outwardly therefrom, the flanges being formed with aligned apertures, the aperture in one of the flanges being formed with a flat;

a foot having a base and a threaded leg, the leg extending through said aligned apertures and making a sliding therewith, and the leg having a flat engaging said aperture flat to prevent rotation of the pedestal with respect to the housing and the leg being spaced from the housing and cover to provide an opening accommodating the passage of telephone cable; and a pair of nuts threaded on said leg respectively on the top side and bottom side of one of said flanges, the position of the bottom nut determining the relative vertical position of the housing and pedestal.

9. A service pole for supplying power and/or telephone outlets in a room, the pole being adapted to extend between the floor and the ceiling of the room and the ceiling being the suspended type having means for supporting panels, the pole comprising:

an elongated, hollow, C-shaped outer housing for carrying power and/or telephone conductors, the housing having a base and two sides and the joinder area between the base and the sides being formed with outwardly extending pockets;

a cover removably connected to the housing and extending over the open side of the housing, the open side providing access to the interior of the housing with the cover removed;

means adjacent the top of the outer housing for connecting the same with the ceiling whereby to support the housing in an upright position;

an elongated, hollow, C-shaped inner housing disposed within the outer housing and adapted to carry power conductors and having a cross-sectional area smaller that the cross sectional area of the outer housing, the difference in cross sectional area providing space forming a channel between the inner and outer housings, the channel being for use in carrying telephone conductors and said open side of the inner housing being covered by one wall of said outer housing and the inner housing isolating the power conductors from the telephone conductor channel;

a plurality of retainers disposed within the outer housing, each retainer having a base engaging the base of the outer housing and extending into and engaging said pockets and also having a C-shaped socket surrounding said inner housing to maintain the inner housing in position;

means holding the retainers in the outer housing;

a plurality of receptacle openings in said side of the outer housing which covers the open side of the inner housing; and a plurality of power receptacles mounted in said inner housing and extending outwardly thru the open side thereof and also extending thru said receptacle openings and providing power service outlets.

10. A construction in accordance with claim 9 further including a hollow junction box comprising:

constructed body generally in the form of a cube disposed at the top of said inner housing, the body being construced as by a closed top, three closed sides, an open side and an open bottom;

means connecting one of said closed sides to the inner housing;

an L-shaped cover one leg of which extends over the open side of the body and the other leg of which extends over the bottom of the body and partially covers the open end of the inner housing to an extent to provide an open end to said channel and said other leg having an opening aligned with the open end of the inner housing to provide a passage for power conductors between the inner housing and the interior of the body; and means connecting the L-shaped cover to the body.

11. A construction in accordance with claim 10 wherein said means connecting the L-shaped cover to the body comprises a pair of mounting flanges respectively connected to said closed sides and extending into said open side in engagement with said one leg and screw means joining the leg to the flanges.

12. A service pole for supplying power and/or telephone outlets in a room, the pole being adapted to extend between the floor and ceiling of the room and the ceiling being the suspended type having means for supporting panels, the pole comprising:

an elongated, hollow, C-shaped housing for carrying power and/or telephone conductors, the housing having a base and two sides and the joinder area between the base and the sides being formed with outwardly extending pockets;

a cover removably connected to the housing and extending over the open side of the housing, the open side providing access to the interior of the housing with the cover removed;

means adjacent the top of the housing for connecting the same with the ceiling whereby to support the housing in an upright position;

an elongated, hollow, C-shaped inner housing disposed within the outer housing and adapted to carry power conductors and having a cross-sectional area smaller than the cross-sectional area of the outer housing, the difference in cross sectional area providing space forming a channel between the inner and outer housings, the channel being for use in carrying telephone conductors and said open side of the inner housing being covered by one wall of said outer housing walls and the inner housing isolating the power conductors from the telephone conductor channel;

a plurality of retainers disposed within the outer housing, each retainer having a base engaging the base of the outer housing and extending into and engaging said pockets and also having a C-shaped socket surrounding said inner housing to maintain the inner housing in position;

locking means locking the retainers in the outer housing;

the base of said socket being dimensioned to provde for a snug, sliding fit between the base and said pockets whereby, for assembly, the retainer can be slid into the outer housing to a desired position and locked in such position by said locking means;

said socket and said inner housing being dimensioned to provide for a snug, sliding fit between the inner housing and the socket whereby, for assembly, the inner housing can be slid into the socket when the same is positioned in the outer housing; and means preventing the inner housing from sliding downwardly with respect to the retainers.

13. A construction in accordance with claim 12 wherein said means preventing sliding of the inner housing includes a set screw in at least one retainer and bearing on said inner housing.

14. In a service pole for supplying power and/or telephone outlets in a room the pole being adapted to extend between the floor and ceiling of the room and the ceiling being the suspended type having means for supporting panels, the sub-assembly comprising:

an elongated, hollow, C-shaped housing for carrying power and/or telephone conductors, the housing having a base and two sides and the joinder area between the base and the sides being formed with outwardly extending pockets;

an elongated, hollow, C-shaped inner housing disposed within the outer housing and adapted to carry power conductors and having a cross-sectional area smaller than the cross-sectional area of the outer housing, the difference in cross sectional area providing space forming a channel between the inner and outer housings, the channel being for use in carrying telephone conductors and said open side of the inner housing being covered by one wall of said outer housing wall and the inner housing isolating the power conductors from the telephone conductor channel;

a plurality of retainers disposed within the outer housing, each retainer having a base engaging the base of the outer housing and extending into and engaging said pockets and also having a C-shaped socket surrounding said inner housing to maintain the inner housing in position;

locking means locking the retainers in the outer housing;

the base of said socket being dimensioned to provide for a snug, sliding fit between the base and said pockets whereby, for assembly, the retainer can be slid into the outer housing to a desired position and locked in such position by said locking means; and said socket and said inner housing being dimensioned to provide for a snug, sliding fit between the inner housing and the socket whereby, for assembly, the inner housing can be slid into the socket when the same is positioned in the outer housing.

15. For a service pole for supplying power and/or telephone outlets in a room, the pole being adapted to extend between the floor and ceiling of the room and the ceiling between the suspended type having means for supporting panels, a junction box comprising:
- a body generally in the form of a cube, the body being constructed as by a closed top, three closed sides, an open side and an open bottom;
- an L-shaped cover one leg of which extends over the open side of the body and the other leg of which extends over the bottom of the body, the other leg having an opening providing a passage to the interior of the box;
- a first, flat tongue connected to and extending away from one of said closed sides;
- a second, flat tongue connected to and extending away from a closed side adjacent to said one closed side whereby the flat tongues are oriented at right angles to one another; and
- means connecting the L-shaped cover to the body.

16. A construction in accordance with claim 15 wherein said means connecting the L-shaped cover to the body comprises a pair of mounting flanges respectively connected to said closed sides and extending into said open side in engagement with said one leg and screw means joining the leg of the flanges.

* * * * *